(12) United States Patent
Joko et al.

(10) Patent No.: US 11,836,449 B2
(45) Date of Patent: Dec. 5, 2023

(54) INFORMATION PROCESSING DEVICE AND INFORMATION PROCESSING METHOD FOR JUDGING THE SEMANTIC RELATIONSHIP BETWEEN WORDS AND SENTENCES

(71) Applicant: MITSUBISHI ELECTRIC CORPORATION, Tokyo (JP)

(72) Inventors: Hideaki Joko, Tokyo (JP); Takahiro Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 17/223,343

(22) Filed: Apr. 6, 2021

(65) Prior Publication Data

US 2021/0224475 A1 Jul. 22, 2021

Related U.S. Application Data

(63) Continuation of application No. PCT/JP2018/041266, filed on Nov. 7, 2018.

(51) Int. Cl.
*G06F 40/268* (2020.01)
*G06F 16/23* (2019.01)
*G06F 40/30* (2020.01)

(52) U.S. Cl.
CPC ........ *G06F 40/268* (2020.01); *G06F 16/2379* (2019.01); *G06F 40/30* (2020.01)

(58) Field of Classification Search
CPC ..... G06F 16/2379; G06F 40/268; G06F 40/30
See application file for complete search history.

(56) References Cited

U.S. PATENT DOCUMENTS 5,461,698 A * 10/1995 Schwanke ................ G06N 3/04
706/31
8,676,725 B1 * 3/2014 Lin ........................ G06N 20/00
706/14

(Continued)

FOREIGN PATENT DOCUMENTS

JP 2009-140009 A 6/2009
WO WO 2013/153725 A1 10/2013

OTHER PUBLICATIONS

Taiwanese Declaration of Refusal dated Nov. 30, 2021 in counterpart Taiwanese Patent Application No. 108103482 with an English translation.

(Continued)

*Primary Examiner* — Eric Yen
(74) *Attorney, Agent, or Firm* — Birch, Stewart, Kolasch & Birch, LLP

(57) ABSTRACT

An information processing device includes processing circuitry to acquire object spatiotemporal information including spatiotemporal information indicating coordinates of objects in time and space and a name of each of the objects and to generate morphological analysis-undergone object spatiotemporal information by executing a morphological analysis as a process of analyzing the name of each of the objects included in the object spatiotemporal information into one or more words; to acquire morphological analysis-undergone names of vicinal objects, as objects existing in a vicinity of each of the objects in time and space, from the morphological analysis-undergone object spatiotemporal information; to calculate a distribution of vicinal object name words, as words included in the names of the vicinal objects of each of the objects, from the morphological analysis-undergone names; and to convert the distribution of (Continued)

the vicinal object name words to a spatiotemporal information-considered distributed representation regarding words.

13 Claims, 10 Drawing Sheets

(56) References Cited

U.S. PATENT DOCUMENTS

| | | | | |
|---|---|---|---|---|
| 2003/0167162 | A1* | 9/2003 | Simpson | G06F 40/20 |
| | | | | 704/9 |
| 2003/0185450 | A1 | 10/2003 | Garakani et al. | |
| 2009/0141982 | A1 | 6/2009 | Suzuki | |
| 2019/0266283 | A1* | 8/2019 | Shukla | G06N 20/00 |
| 2022/0300528 | A1* | 9/2022 | Reymond | G06F 16/26 |

OTHER PUBLICATIONS

Taiwanese Office Action and Search Report for Taiwanese Application No. 108103482, dated Sep. 7, 2021, with an English translation of the Office Action.

Eo, "A Study on Extracting Geographic Locations from Twitter Data based on Geographic Information Retrieval," Seoul National University, 2016, 134 pages total, with an English abstract.

Kim et al., "Construction and Application of POI Database with Spatial Relations Using SNS," Journal of Korea Spatial Information Society, vol. 22, No. 4. 2014, pp. 21-38, 19 pages total, with an English abstract.

Korean Notification of Reason for Refusal for Korean Application No. 10-2021-7012390, dated Sep. 23, 2021, with an English translation.

Deerwester et al., "Indexing by Latent Semantic Analysis" Journal of the American Society for Information Science, 1990, vol. 41, No. 6, p. 391-407.

Hinton et al., "Reducing the Dimensionality of Data with Neural Networks", Science, Jul. 28, 2006, vol. 313, p. 504-507.

Joko et al., "Intention Understanding with Small Training Data Sets by Utilizing Multi-Task Transfer Learning", The Japanese Society for Artificial Intelligence, Interactive Information Access and Visual Mining (19th), 2018, p. 1-4.

Mikolov et al., "Efficient Estimation of Word Representations in Vector Space", International Conference on Learning Representations, Sep. 7, 2013, p. 1-12.

Indian Office Action for Indian Application No. 202147013449, dated Feb. 8, 2022, with English translation.

* cited by examiner

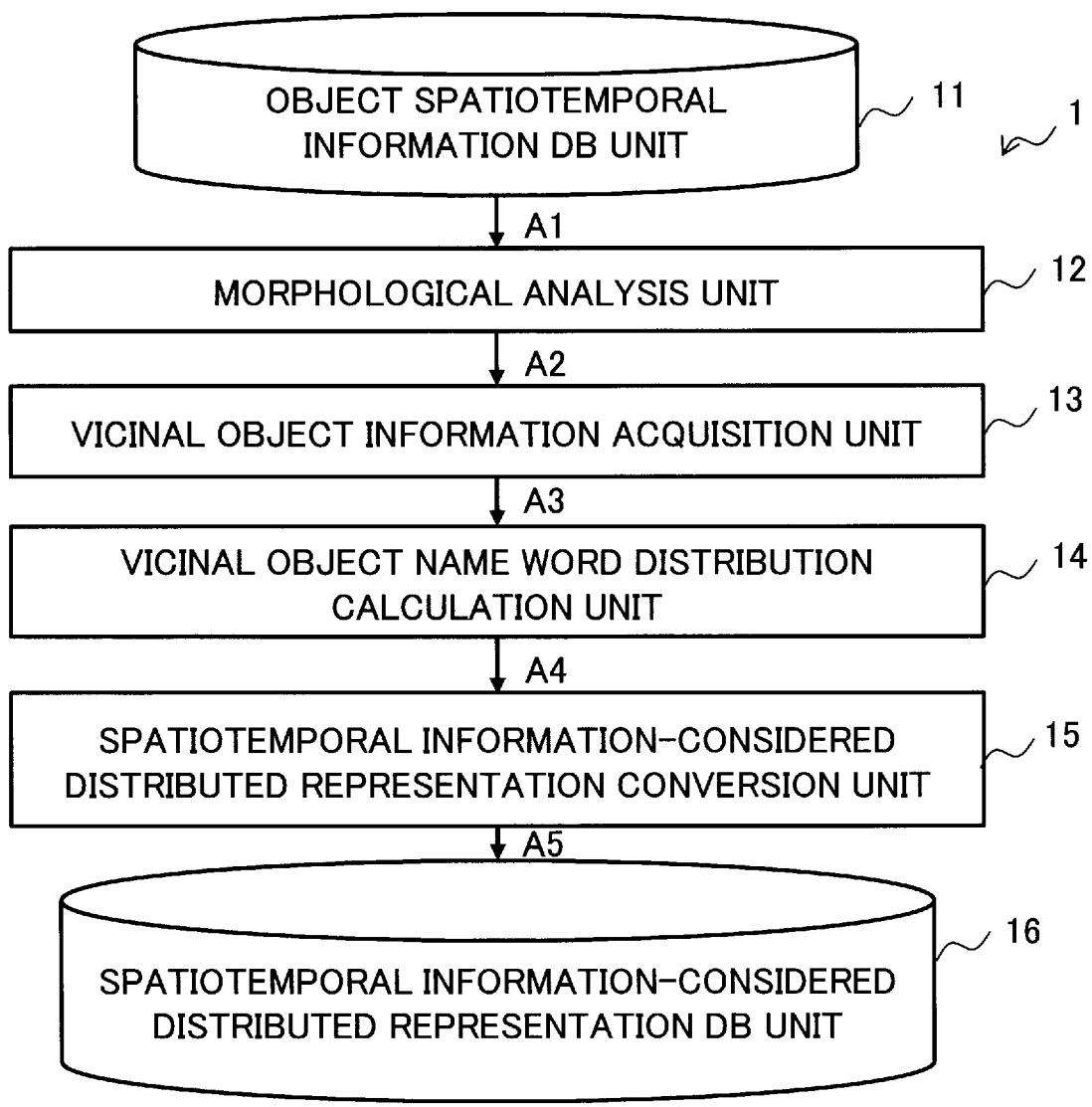

| NAME OF OBJECT | COORDINATE INFORMATION (SPATIOTEMPORAL INFORMATION) ON OBJECT IN TIME AND SPACE |
|---|---|
| T-kyo University | 35.7127, 139.7620 |
| W-ta University | 35.7087, 139.7196 |
| W Univ. Main Gate | 35.7083, 139.7224 |
| T-kyo University School of Medicine Attached Hospital | 35.7108, 139.7654 |
| ... | |

OBJECT SPATIOTEMPORAL INFORMATION DB UNIT 11

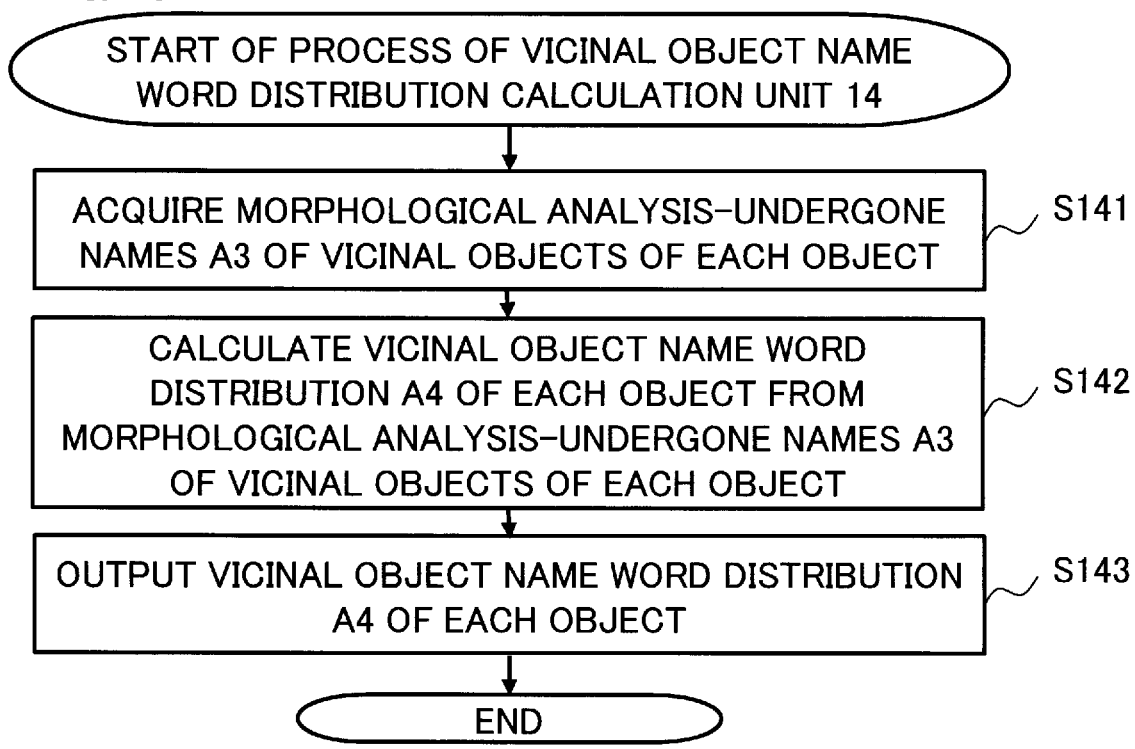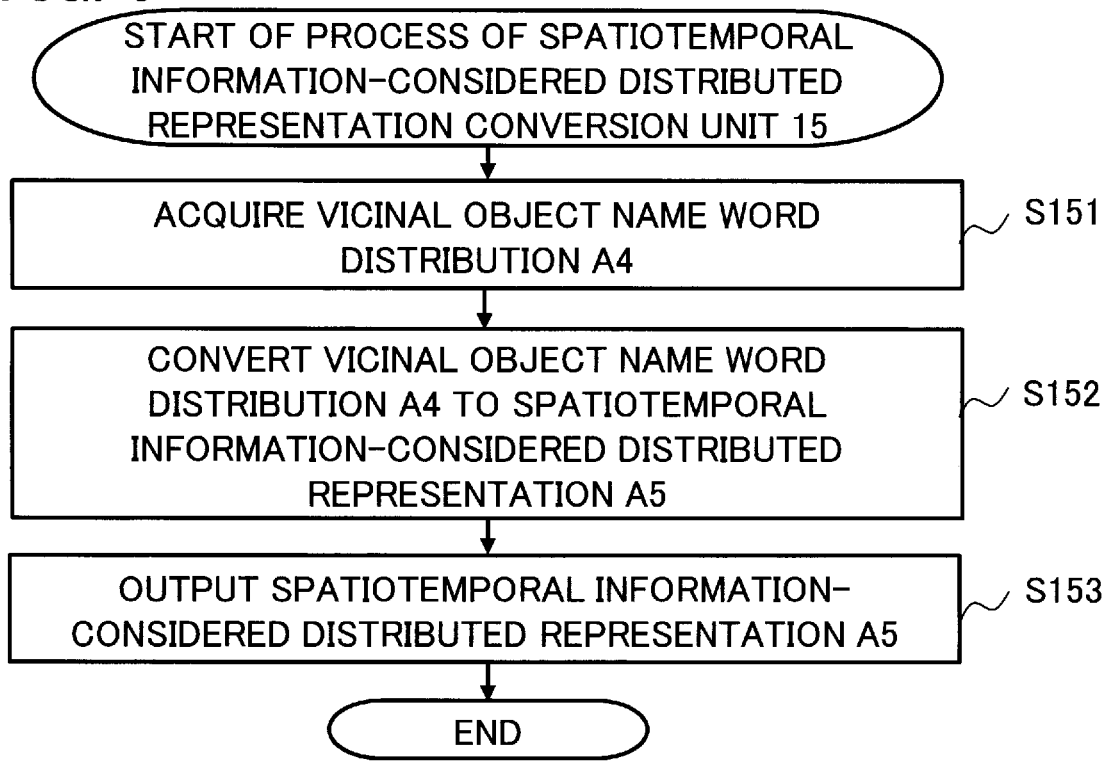

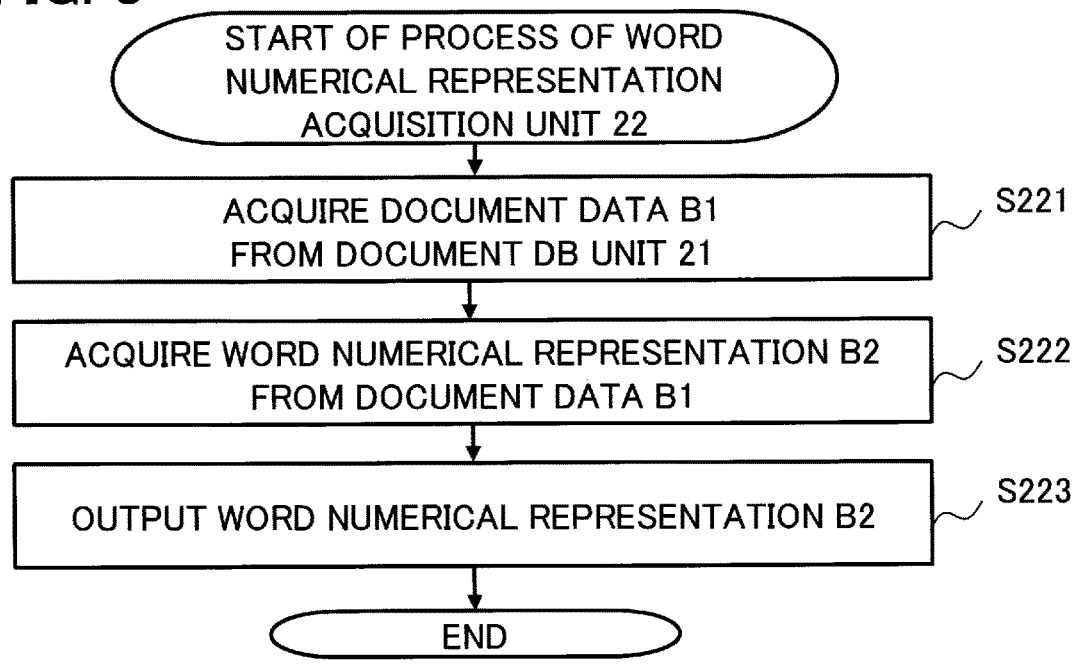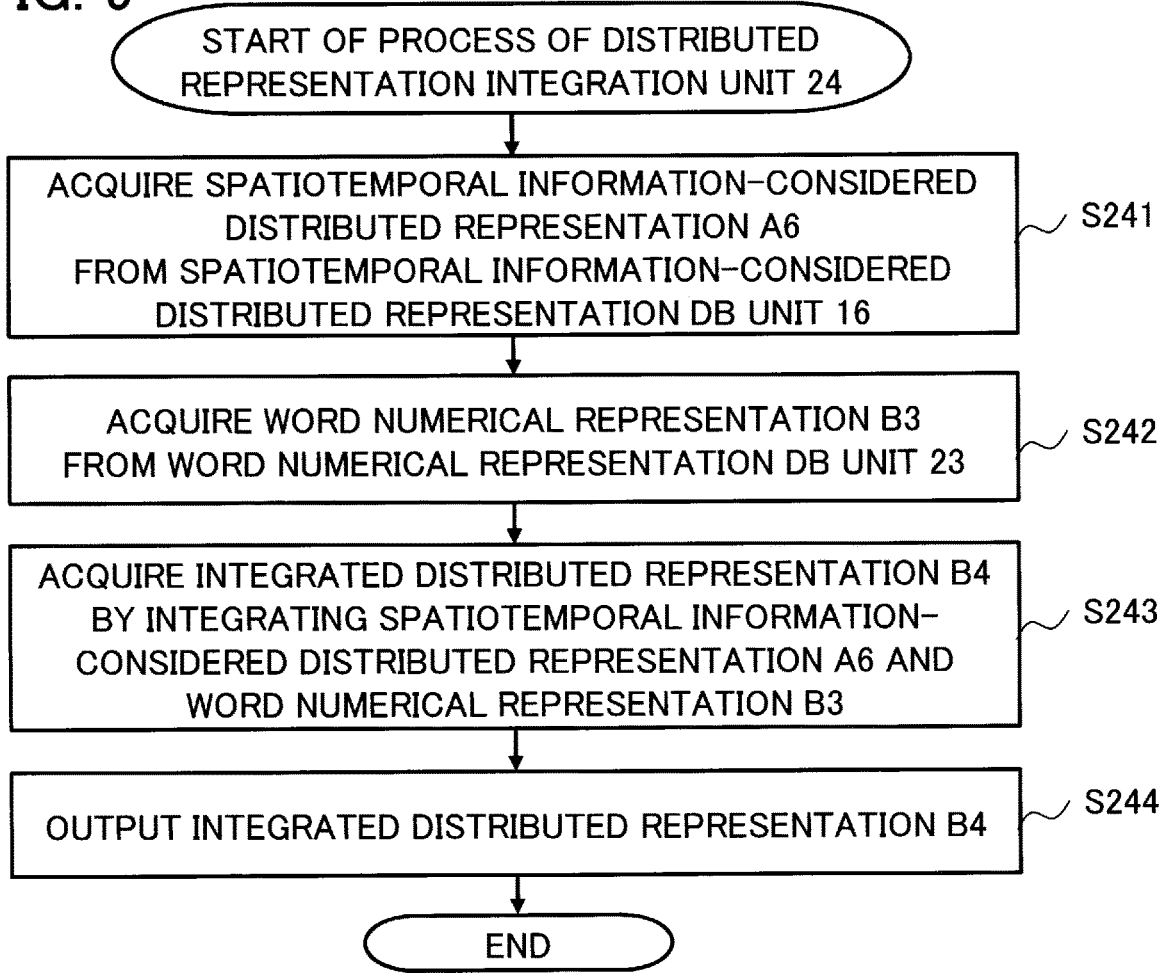

INFORMATION PROCESSING DEVICE AND INFORMATION PROCESSING METHOD FOR JUDGING THE SEMANTIC RELATIONSHIP BETWEEN WORDS AND SENTENCES

CROSS-REFERENCE TO RELATED APPLICATION

This application is a continuation application of International Application No. PCT/JP2018/041266 having an international filing date of Nov. 7, 2018.

BACKGROUND OF THE INVENTION

1. Field of the Invention

The present invention relates to an information processing device, an information processing method, and an information processing program.

2. Description of the Related Art

With the prevalence of personal computers and the Internet, the amount of digitized documents (i.e., document data) accessible to users is increasing. Thus, a technology for efficiently finding an intended document in a large amount of digitized documents is being requested. In technologies handling a natural language as typified by document search technology, distributed representations (i.e., numerical vectors) are used in many cases in order to enable a computer to process meanings of words.

Conventionally, the acquisition of the distributed representations is made based on a hypothesis (i.e., distribution hypothesis) that in regard to words whose meanings are similar to each other, distributions of words appearing in the vicinity of the words in a sentence including the words (i.e., vicinal words) are also similar to each other. For example, Non-patent Reference 1 proposes a method of acquiring the meanings of words based on the distribution hypothesis.

Non-patent Reference 1: Tomas Mikolov and three others, "Efficient Estimation of Word Representations in Vector Space", ICLR (International Conference on Learning Representations) 2013.

However, since spatiotemporal information is not taken into consideration in the aforementioned method, words having similar distributions of vicinal words are judged to have distributed representations similar to each other even if the words are words representing different objects. Therefore, when it is attempted to acquire words having the same meaning (i.e., synonyms) by the aforementioned method, words having similar distributions of vicinal words are judged to be words having the same meaning even if the words are words representing different objects. In short, there is a problem in that there are cases where words having an intended semantic relationship with each other (e.g., synonyms) cannot be acquired correctly.

For example, there has been known that when it is attempted to acquire synonyms of "Todai" that is a targeted word (referred to also as a "considered word") by the aforementioned method, "Kyodai" and "Sodai", as words having distributions of vicinal words similar to the distribution of vicinal words of the considered word "Todai", are acquired as the synonyms of the considered word "Todai". In short, words that are not synonyms of the considered word are acquired as the synonyms. Here, "Todai" ("Todai" in Japanese language pronunciation) is an abbreviation of "Tokyo Daigaku" ("Tokyo Daigaku" in Japanese language pronunciation, meaning "Tokyo University"). "Kyodai" ("Kyodai" in Japanese language pronunciation) is an abbreviation of "Kyoto Daigaku" ("Kyoto Daigaku" in Japanese language pronunciation, meaning "Kyoto University"). "Sodai" ("Sodai" in Japanese language pronunciation) is an abbreviation of "Waseda Daigaku" ("Waseda Daigaku" in Japanese language pronunciation, meaning "Waseda University").

SUMMARY OF THE INVENTION

An object of the present invention, which has been made to resolve the above-described problem with the conventional technology, is to provide an information processing device, an information processing method and an information processing program that make it possible to correctly acquire words or sentences having an intended semantic relationship with each other.

An information processing device according to an aspect of the present invention includes a morphological analysis unit to acquire object spatiotemporal information including spatiotemporal information indicating coordinates of a plurality of objects in time and space and a name of each of the plurality of objects and to generate morphological analysis-undergone object spatiotemporal information by executing a morphological analysis as a process of analyzing the name of each of the plurality of objects included in the object spatiotemporal information into one or more words, a vicinal object information acquisition unit to acquire morphological analysis-undergone names of vicinal objects, as objects existing in a vicinity of each of the plurality of objects in time and space, from the morphological analysis-undergone object spatiotemporal information, a vicinal object name word distribution calculation unit to calculate a distribution of vicinal object name words, as words included in the names of the vicinal objects of each of the plurality of objects, from the morphological analysis-undergone names, and a spatiotemporal information-considered distributed representation conversion unit to convert the distribution of the vicinal object name words to a spatiotemporal information-considered distributed representation regarding words.

An information processing method according to an aspect of the present invention includes a step of acquiring object spatiotemporal information including spatiotemporal information indicating coordinates of a plurality of objects in time and space and a name of each of the plurality of objects and generating morphological analysis-undergone object spatiotemporal information by executing a morphological analysis as a process of analyzing the name of each of the plurality of objects included in the object spatiotemporal information into one or more words, a step of acquiring morphological analysis-undergone names of vicinal objects, as objects existing in a vicinity of each of the plurality of objects in time and space, from the morphological analysis-undergone object spatiotemporal information, a step of calculating a distribution of vicinal object name words, as words included in the names of the vicinal objects of each of the plurality of objects, from the morphological analysis-undergone names, and a step of converting the distribution of the vicinal object name words to a spatiotemporal information-considered distributed representation regarding words.

According to the present invention, the spatiotemporal information-considered distributed representation as the distributed representation taking the object spatiotemporal information into consideration can be acquired. Further, by using the spatiotemporal information-considered distributed representation, it becomes possible to correctly judge the semantic relationship between a pair of words or the semantic relationship between a pair of sentences.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram schematically showing a configuration of an information processing device according to a first embodiment of the present invention;

FIG. 5 is a flowchart showing a process executed by a vicinal object name word distribution calculation unit in the first embodiment;

FIG. 6 is a flowchart showing a process executed by a spatiotemporal information-considered distributed representation conversion unit in the first embodiment;

FIG. 8 is a flowchart showing a process executed by a word numerical representation acquisition unit in the second embodiment;

FIG. 9 is a flowchart showing a process executed by a distributed representation integration unit in the second embodiment;

DETAILED DESCRIPTION OF THE INVENTION

Figures 2A, 2B, 2C:
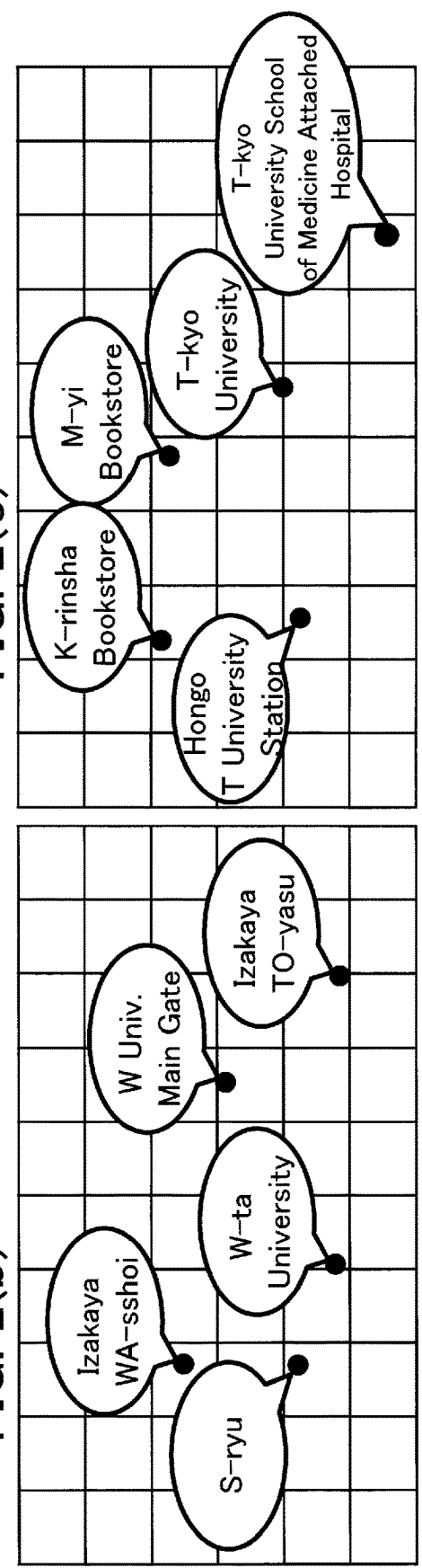
FIG. 2(a) is a diagram showing an example of an object spatiotemporal information database in the first embodiment in tabular form.
FIGS. 2(b) and 2(c) are diagrams showing examples of the object spatiotemporal information database in the first embodiment on spatiotemporal coordinates.

Information processing devices, information processing methods and information processing programs according to embodiments of the present invention will be described below with reference to the drawings. An information processing device according to a first embodiment is a device that acquires a spatiotemporal information-considered distributed representation. An information processing device according to a second embodiment is a semantic relationship judgment device that judges a semantic relationship between a pair of words (referred to also as a "word pair") by using a word numerical representation and the spatiotemporal information-considered distributed representation. An information processing device according to a third embodiment is a semantic relationship judgment device that judges the semantic relationship between a pair of sentences (referred to also as a "sentence pair") by using a sentence numerical representation and a spatiotemporal information-considered sentence distributed representation. The following embodiments are just examples and a variety of modifications are possible within the scope of the present invention.

In the present application, "spatiotemporal information" is information that is represented by spatial coordinates and a temporal coordinate; however, the "spatiotemporal information" does not necessarily have to include information regarding both of the spatial coordinates and the temporal coordinate. The "spatiotemporal information" includes also information that is made up exclusively of the spatial coordinates.

(1) First Embodiment (1-1) Configuration of Information Processing Device 1

FIG. 1 is a block diagram schematically showing a configuration of an information processing device 1 according to a first embodiment of the present invention. The information processing device 1 is a device capable of executing an information processing method according to the first embodiment.

As shown in FIG. 1, the information processing device 1 includes a morphological analysis unit 12, a vicinal object information acquisition unit 13, a vicinal object name word distribution calculation unit 14 and a spatiotemporal information-considered distributed representation conversion unit 15. The information processing device 1 may include an object spatiotemporal information database unit (referred to also as an "object spatiotemporal information DB unit") 11 and a spatiotemporal information-considered distributed representation database unit (referred to also as a "spatiotemporal information-considered distributed representation DB unit") 16.

The object spatiotemporal information DB unit 11 is a storage device that stores an object spatiotemporal information database (referred to also as an "object spatiotemporal information DB") including object spatiotemporal information A1. The object spatiotemporal information A1 includes spatiotemporal information indicating spatiotemporal coordinates of a plurality of objects and a name of each of the plurality of objects.

FIG. 2(a) is a diagram showing an example of the object spatiotemporal information DB in the first embodiment in tabular form. As shown in FIG. 2(a), the object spatiotemporal information DB unit 11 includes a plurality of names of a plurality of objects in time and space and the spatiotemporal information indicating spatiotemporal coordinates of the plurality of objects corresponding to the plurality of names. The object spatiotemporal information DB shown in FIG. 2(a) indicates "T-kyo University" as the name of an object and the spatiotemporal coordinates of the object having the name, "W-ta University" as the name of an object and the spatiotemporal coordinates of the object having the name, "W Univ. Main Gate" as the name of an object and the spatiotemporal coordinates of the object having the name, and "T-kyo University School of Medicine Attached Hospital" as the name of an object and the spatiotemporal coordinates of the object having the name. Put another way, the object spatiotemporal information DB includes a plurality of names of a plurality of objects in time and space and a vector in arbitrary dimensions associated with each of the plurality of names.

FIG. 2(b) and FIG. 2(c) are diagrams showing examples of the object spatiotemporal information DB in the first embodiment on spatiotemporal coordinates. In FIG. 2(b) and FIG. 2(c), vertical lines and horizontal lines are lines extending in coordinate axis directions of the spatiotemporal coordinates. Each black spot mark indicates coordinates of an object in time and space. FIG. 2(b) shows an example of a considered object (e.g., "W-ta University") and vicinal objects (e.g., "S-ryu" (S-dragon), "Izakaya WA-sshoi", "W Univ. Main Gate" and "Izakaya TO-yasu"). FIG. 2(c) shows an example of a considered object (e.g., "T-kyo University") and vicinal objects (e.g., "Hongo T University Station", "K-rinsha Bookstore", "M-yi Bookstore" and "T-kyo University School of Medicine Attached Hospital").

The morphological analysis unit 12 acquires the object spatiotemporal information A1, performs morphological analysis on the name of each of a plurality of objects included in the object spatiotemporal information A1, and thereby generates morphological analysis-undergone object spatiotemporal information A2. In the morphological analysis, the name of each of the plurality of objects is analyzed into one or more words. For example, the morphological analysis unit 12 segments "T-kyo University School of Medicine Attached Hospital" into "T-kyo University", "School of Medicine", "Attached" and "Hospital". For example, the morphological analysis unit 12 segments "M-yi Bookstore" into "M-yi" and "Bookstore".

The vicinal object information acquisition unit 13 acquires the morphological analysis-undergone object spatiotemporal information A2 and acquires morphological analysis-undergone names A3 of the vicinal objects from the morphological analysis-undergone object spatiotemporal information A2. The vicinal objects are objects existing in the vicinity of each of the plurality of objects in time and space. In regard to a considered object, the judgment on which objects are the vicinal objects can be made based on, for example, a distance between objects in time and space such as Euclidean distance, cosine distance (i.e., cosine similarity) or Levenshtein distance. If the distance between the considered object and a vicinal object candidate is less than or equal to a predetermined value, the vicinal object information acquisition unit 13 can judge that the vicinal object candidate is a vicinal object.

The vicinal object name word distribution calculation unit 14 acquires the morphological analysis-undergone names A3 of the vicinal objects and calculates a distribution A4 of vicinal object name words (vicinal object name word distribution A4) from the morphological analysis-undergone names A3. The vicinal object name word means a word included in the name of a vicinal object of each of the plurality of objects.

The vicinal object name word distribution calculation unit 14 can calculate the vicinal object name word distribution A4 as follows: For example, when the vicinal objects of "T-kyo University" are "T-kyo University School of Medicine Attached Hospital" and "M-yi Bookstore" in FIG. 2(c), the vicinal object name words of "T-kyo University" are "T-kyo University", "School of Medicine", "Attached", "Hospital", "M-yi" and "Bookstore". The vicinal object name word distribution calculation unit 14 is capable of calculating the vicinal object name word distribution A4 based on the vicinal object name words "T-kyo University", "School of Medicine", "Attached", "Hospital", "M-yi" and "Bookstore" and the number of times of appearance of each of the vicinal object name words.

Further, in FIG. 2(b) and FIG. 2(c), (x, y) coordinates as coordinates in spatial dimensions are used as the vector in arbitrary dimensions associated with the name of an object. However, it is also possible to add a t coordinate, as a coordinate representing a temporal dimension, to the (x, y) coordinates to form the vector in arbitrary dimensions associated with the name of an object shown in FIG. 2(b) and FIG. 2(c). In this case, it becomes possible to acquire a distributed representation taking also temporal changes into consideration.

The spatiotemporal information-considered distributed representation conversion unit 15 acquires the vicinal object name word distribution A4 and converts the vicinal object name word distribution A4 to a spatiotemporal information-considered distributed representation A5.

The spatiotemporal information-considered distributed representation database unit 16 is a storage device that stores a spatiotemporal information-considered distributed representation database (referred to also as a "spatiotemporal information-considered distributed representation DB") including the spatiotemporal information-considered distributed representations A5.

Figure 3:
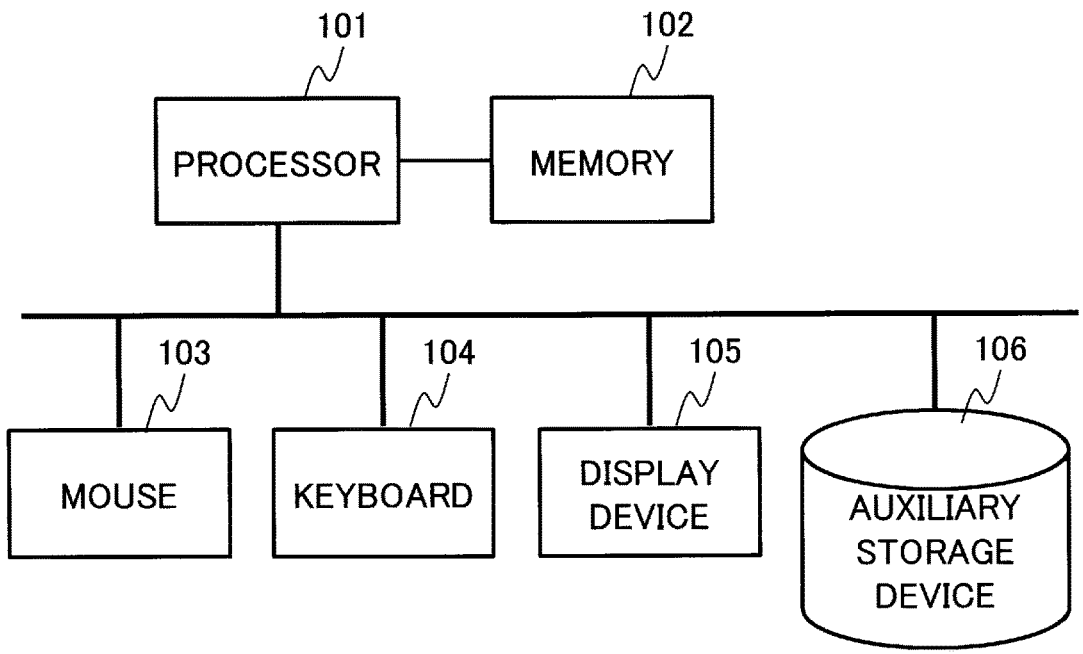
FIG. 3 is a diagram showing an example of a hardware configuration of the information processing device according to the first embodiment.

FIG. 3 is a diagram showing an example of a hardware configuration of the information processing device 1 according to the first embodiment. The information processing device 1 may include processing circuitry that can execute the information processing method according to the first embodiment. The information processing device 1 includes, for example, a memory 102 as a storage device or a non-transitory computer-readable storage medium that stores a program as software, namely an information processing program according to the first embodiment, and a processor 101 as an information processing unit that executes the program stored in the memory 102. The information processing device 1 is a computer, for example. The information processing program according to the first embodiment is stored in the memory 102 from a record medium storing information via a reading device (not shown), or via a communication interface (not shown) connectable to the Internet. Further, the information processing device 1 may include an input device as a user operation unit such as a mouse 103 and a keyboard 104 and an output device such as a display device 105 for displaying images and an audio output unit (not shown) for outputting sound. Furthermore, the information processing device 1 may include an auxiliary storage device 106 that stores various items of information such as a database. The auxiliary storage device 106 can be a storage device existing in the cloud and connectable via a communication interface (not shown).

The morphological analysis unit 12, the vicinal object information acquisition unit 13, the vicinal object name word distribution calculation unit 14 and the spatiotemporal information-considered distributed representation conversion unit 15 shown in FIG. 1 can be implemented by the processor 101 executing a program stored in the memory 102. Further, the object spatiotemporal information DB unit 11 and the spatiotemporal information-considered distributed representation DB unit 16 shown in FIG. 1 can be a part of the auxiliary storage device 106.

(1-2) Operation of Information Processing Device 1

First, the morphological analysis unit 12 acquires the object spatiotemporal information A1 from the object spatiotemporal information DB unit 11, performs the morphological analysis on the name of each of the plurality of objects included in the object spatiotemporal information A1, thereby generates the morphological analysis-undergone object spatiotemporal information A2, and outputs the morphological analysis-undergone object spatiotemporal information A2.

Figure 4:
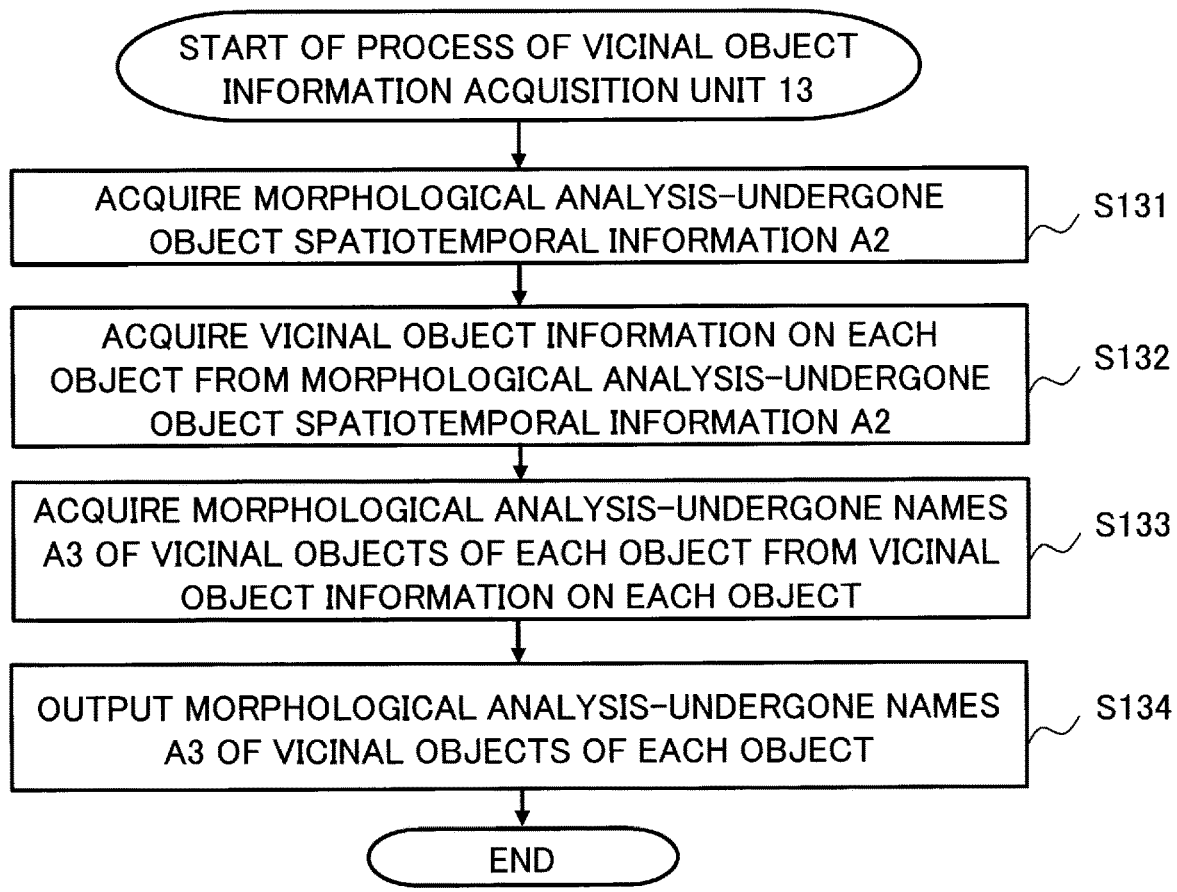
FIG. 4 is a flowchart showing a process executed by a vicinal object information acquisition unit in the first embodiment.

FIG. 4 is a flowchart showing a process executed by the vicinal object information acquisition unit 13 in the first embodiment. As shown in FIG. 4, the vicinal object information acquisition unit 13 acquires the morphological analysis-undergone object spatiotemporal information A2 (step S131), acquires vicinal object information on each object from the morphological analysis-undergone object spatiotemporal information A2 (step S132), acquires the morphological analysis-undergone names A3 of the vicinal objects of each object from the vicinal object information on each object (step S133), and outputs the morphological analysis-undergone names A3 of the vicinal objects of each object (step S134).

FIG. 5 is a flowchart showing a process executed by the vicinal object name word distribution calculation unit 14 in the first embodiment. As shown in FIG. 5, the vicinal object name word distribution calculation unit 14 acquires the morphological analysis-undergone names A3 of the vicinal objects (step S141), calculates the vicinal object name word distribution A4 from the morphological analysis-undergone names A3 (step S142), and outputs the vicinal object name word distribution A4 (step S143). The vicinal object name word means a word included in the name of a vicinal object of each of the plurality of objects.

FIG. 6 is a flowchart showing a process executed by the spatiotemporal information-considered distributed representation conversion unit 15 in the first embodiment. As shown in FIG. 6, the spatiotemporal information-considered distributed representation conversion unit 15 acquires the vicinal object name word distribution A4 (step S151), converts the vicinal object name word distribution A4 to the spatiotemporal information-considered distributed representation A5 (step S152), and outputs the spatiotemporal information-considered distributed representation A5 (step S153).

(1-3) Modification of Vicinal Object Name Word Distribution Calculation Unit 14

It is also possible for the vicinal object name word distribution calculation unit 14 to execute the conversion from the vicinal object name word distribution A4 to the spatiotemporal information-considered distributed representation A5 shown in the step S152 in FIG. 6 as follows: For example, when the vicinal object name words of "T-kyo University School of Medicine Attached Hospital" are "T-kyo University", "M-yi" and "Bookstore", the vicinal object name words of each of "T-kyo University", "School of Medicine", "Attached" and "Hospital" are "T-kyo University", "M-yi" and "Bookstore". The vicinal object name word distribution A4 is calculated based on the vicinal object name words "T-kyo University", "M-yi" and "Bookstore" and the probabilities of appearance of the vicinal object name words.

The vicinal object name word distribution calculation unit 14 acquires distributed representations that maximize the likelihood of appearance probability p (hereinafter represented also as "p") of the vicinal object name words that each of "T-kyo University", "School of Medicine", "Attached" and "Hospital" causes the vicinal object name words "T-kyo University", "M-yi" and "Bookstore" to appear.

The likelihood can be obtained by using the following expression (1):

$$l = \sum_{i,t} \sum_{1 \leq k \leq n, u} \log p(w_{i,k,u} | w_{i,0,t}) \quad (1)$$

$$p(w_{i,k,u} | w_{i,0,t}) = \frac{e^{v'(w_{i,k,u})^T v(w_{i,0,t})}}{\sum_w e^{v'(w)^T v(w_{i,0,t})}}. \quad (2)$$

In the expressions (1) and (2), i (hereinafter represented also as "i") is a unique ID (identifier) assigned to each object.

The character k (hereinafter represented also as "k") is an integer representing an object that is the k-th closest to the aforementioned each object.

The character u (hereinafter represented also as "u") indicates the position of a word in the morphological analysis-undergone names of the aforementioned each object.

For example, the morphological analysis-undergone names of each object, consisting of j words, can be represented as follows:

$$(w_{i,k,1}, w_{i,k,2}, \ldots, w_{i,k,j}).$$

The notation $w_{i,0,t}$ represents the t (hereinafter represented also as "t")-th word in the morphological analysis-undergone names of an object whose ID is i among the aforementioned objects.

The notation $w_{i,k,t}$ represents the t-th word in the morphological analysis-undergone names of an object that is the k-th closest to the object whose ID is i among the aforementioned objects.

Notations $v(w_{i,0,t})$, $v(w_{i,k,t})$ represent the distributed representations of the words.

The notation $p(w_{i,k,u}|w_{i,0,t})$ represents a probability that $w_{i,0,t}$ causes $w_{i,k,u}$ to appear as a vicinal object name word.

The aforementioned character l represents a likelihood-purposed function, and the vicinal object name word distribution calculation unit 14 acquires a distributed representation that maximizes the likelihood-purposed function.

It is also possible to acquire the distributed representation that maximizes the likelihood of the appearance probability p of the vicinal object name words by using a different technology such as a technology described in Non-patent Reference 2, for example.

Non-patent Reference 2: Deerwester S. and four others, "Indexing by Latent Semantic Analysis", Journal of the American Society for Information Science, 41(6), 1990.

(1-4) Advantage of Information Processing Device 1

As described above, with the information processing device 1 according to the first embodiment, the spatiotemporal information-considered distributed representation as the distributed representation taking the object spatiotemporal information into consideration can be acquired. Further, by using the spatiotemporal information-considered distributed representation, it becomes possible to correctly judge the semantic relationship between a pair of words or the semantic relationship between a pair of sentences.

(2) Second Embodiment

(2-1) Configuration of Information Processing Device 2

The information processing device 1 according to the above-described first embodiment acquires the distributed representation taking the spatiotemporal information into consideration. However, the information processing device 1 according to the first embodiment does not make use of the characteristics of the "distribution hypothesis that in regard to words whose meanings are similar to each other, the distributions of the vicinal words are also similar to each other" for the acquisition of the distributed representation. Therefore, the information processing device 1 according to the first embodiment represents objects whose spatiotemporal distributions are similar to each other by using similar distributed representations even if the objects are objects represented by words different from each other in the name. For example, a "screw" and a "nut", as objects highly likely to be used in combination with each other, are names different from each other as objects; however their spatiotemporal distributions are similar to each other. Therefore, the information processing device 1 according to the first embodiment represents these objects by using similar distributed representations.

An information processing device 2 according to a second embodiment uses a combination of the spatiotemporal information-considered distributed representation A5 acquired by the method described in the first embodiment and numerical representation of words (referred to also as "word numerical representation" acquired by a word meaning acquisition method based on the distribution hypothesis described in the Non-patent Reference 1 for the judgment on the semantic relationship between a pair of words. The information processing device 2 according to the second embodiment is a word semantic relationship judgment device that judges the semantic relationship between a pair of words.

Figure 7:
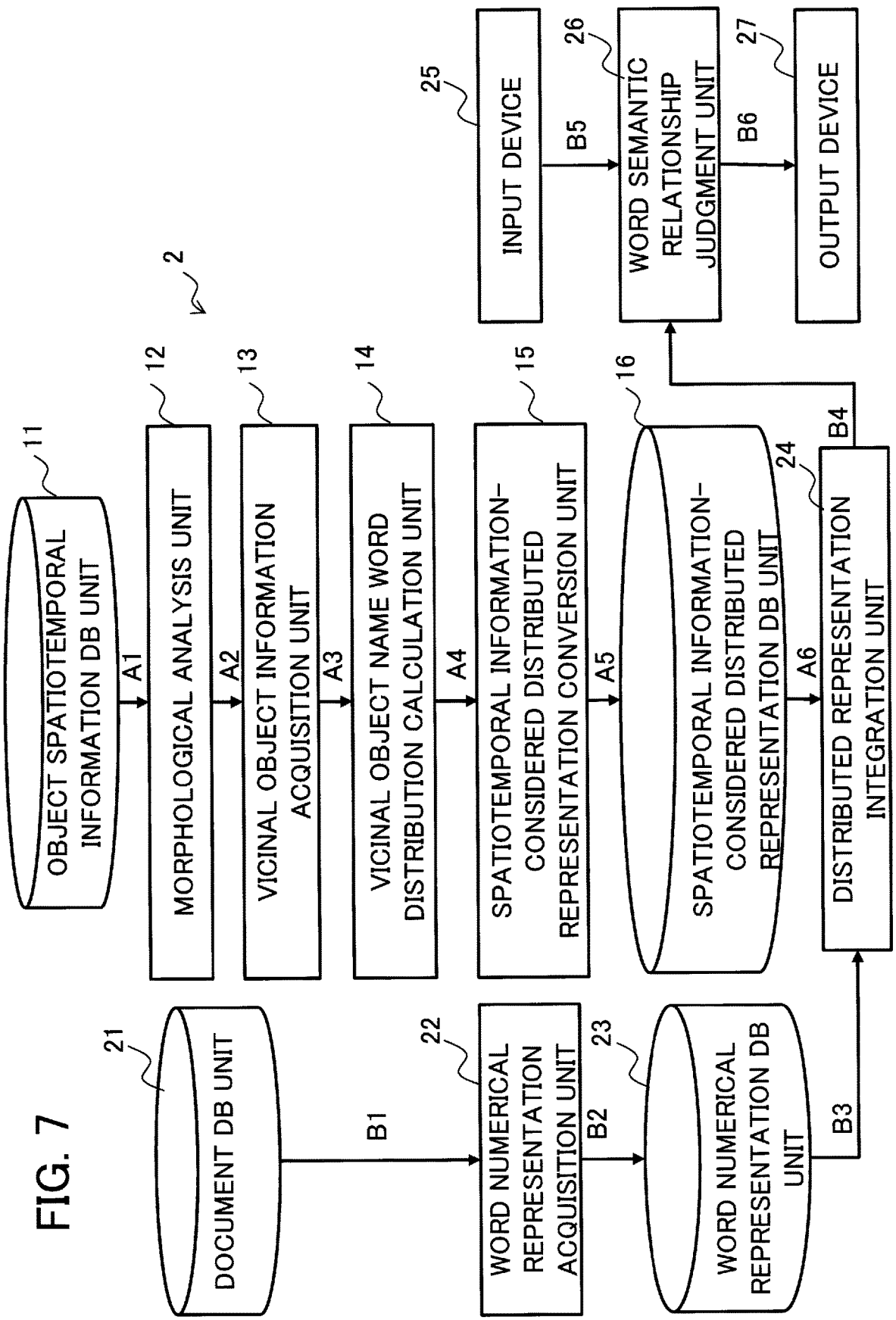
FIG. 7 is a block diagram schematically showing a configuration of an information processing device according to a second embodiment of the present invention.

FIG. 7 is a block diagram schematically showing a configuration of the information processing device 2 according to the second embodiment. The information processing device 2 is a device capable of executing an information processing method according to the second embodiment. In FIG. 7, each component identical or corresponding to a component shown in FIG. 1 is assigned the same reference character as in FIG. 1.

As shown in FIG. 7, the information processing device 2 according to the second embodiment includes a document database unit (referred to also as a "document DB unit") 21 that stores a large-scale document database, a word numerical representation acquisition unit 22, a word numerical representation database unit (referred to also as a "word numerical representation DB unit") 23, a distributed representation integration unit 24, an input device 25, a word semantic relationship judgment unit 26 and an output device 27. The input device 25 is a user operation unit such as a keyboard, for example. The output device 27 is an information provision device for the user such as an image display device or an audio output device.

The word numerical representation acquisition unit 22 acquires document data B1 from the document DB unit 21, and acquires a word numerical representation B2 from the document data B1 by digitizing words included in the document data B1 into numerical values. The word numerical representation DB unit 23 stores the word numerical representation B2. The technology of the acquisition of the word numerical representations is publicly known, and the technology described in the Non-patent Reference 1 can be used as the word numerical representation acquisition technology, for example.

The distributed representation integration unit 24 generates an integrated distributed representation B4 by integrating a spatiotemporal information-considered distributed representation A6 acquired from the spatiotemporal information-considered distributed representation DB unit 16 and a word numerical representation B3 acquired from the word numerical representation DB unit 23. The integrated distributed representation B4 is outputted to the word semantic relationship judgment unit 26. Here, the spatiotemporal information-considered distributed representation A6 is distributed representation selected from the spatiotemporal information-considered distributed representations A5 stored in the spatiotemporal information-considered distributed representation DB unit 16. The word numerical representation B3 are word numerical representations selected from the word numerical representation DB stored in the word numerical representation DB unit 23.

The word semantic relationship judgment unit 26 makes the judgment on the semantic relationship between a pair of words B5 inputted from the input device 25 by using the integrated distributed representation B4. The word semantic relationship judgment unit 26 generates a word semantic relationship judgment result B6. The output device 27 outputs the judgment result B6.

The information processing device 2 according to the second embodiment can be implemented by the same hardware configuration as that shown in FIG. 3. The morphological analysis unit 12, the vicinal object information acquisition unit 13, the vicinal object name word distribution calculation unit 14, the spatiotemporal information-considered distributed representation conversion unit 15, the word numerical representation acquisition unit 22, the distributed representation integration unit 24 and the word semantic relationship judgment unit 26 shown in FIG. 7 can be implemented by the processor 101 executing an information processing program stored in the memory 102. Further, the object spatiotemporal information DB unit 11, the spatiotemporal information-considered distributed representation DB unit 16 and the word numerical representation DB unit 23 shown in FIG. 7 can be a part of the auxiliary storage device 106.

(2-2) Operation of Information Processing Device 2

The operation of the morphological analysis unit 12, the vicinal object information acquisition unit 13, the vicinal object name word distribution calculation unit 14 and the spatiotemporal information-considered distributed representation conversion unit 15 shown in FIG. 7 is the same as that in the first embodiment.

FIG. 8 is a flowchart showing a process executed by the word numerical representation acquisition unit 22 in the second embodiment. As shown in FIG. 8, the word numerical representation acquisition unit 22 acquires the document data B1 from the large-scale document DB unit 21 (step S221), acquires the word numerical representation B2 from the document data B1 by digitizing words included in the document data B1 into numerical values (step S222), and outputs the word numerical representation B2 (step S223).

FIG. 9 is a flowchart showing a process executed by the distributed representation integration unit 24 in the second embodiment. As shown in FIG. 9, the distributed representation integration unit 24 generates the integrated distributed representation B4 by integrating the word numerical representation B3 acquired from the word numerical representation DB unit 23 and the spatiotemporal information-considered distributed representation A6 acquired from the spatiotemporal information-considered distributed representation DB unit 16.

As the method of integrating the spatiotemporal information-considered distributed representation A6 and the word numerical representation B3, the distributed representation integration unit 24 may use the following method, for example.

The spatiotemporal information-considered distributed representation A6 is represented as $v_s=(x_1, x_2, x_3, \ldots)$ and the word numerical representation B3 is represented as $v_e=(y_1, y_2, y_3, \ldots)$.

Further, the integrated distributed representation B4 is represented as $v_c$, which is obtained by integration (e.g., combination, addition, subtraction) of $v_s$ and $v_e$.

For example, the distributed representation integration unit 24 can acquire the integrated distributed representation B4 according to one of the following expressions (3) to (5): The expression (3) indicates the integrated distributed representation B4 acquired by the combination. The expression (4) indicates the integrated distributed representation B4 acquired by the addition. The expression (5) indicates the integrated distributed representation B4 acquired by the subtraction.

$$v_c=(x_1,x_2,x_3, \ldots, y_1,y_2,y_3, \ldots) \quad (3)$$

or $$v_c=(x_1+y_1,x_2+y_2,x_3+y_3, \ldots) \quad (4)$$

or $$v_c=(x_1-y_1,x_2-y_2,x_3-y_3, \ldots) \quad (5)$$

Figure 10:
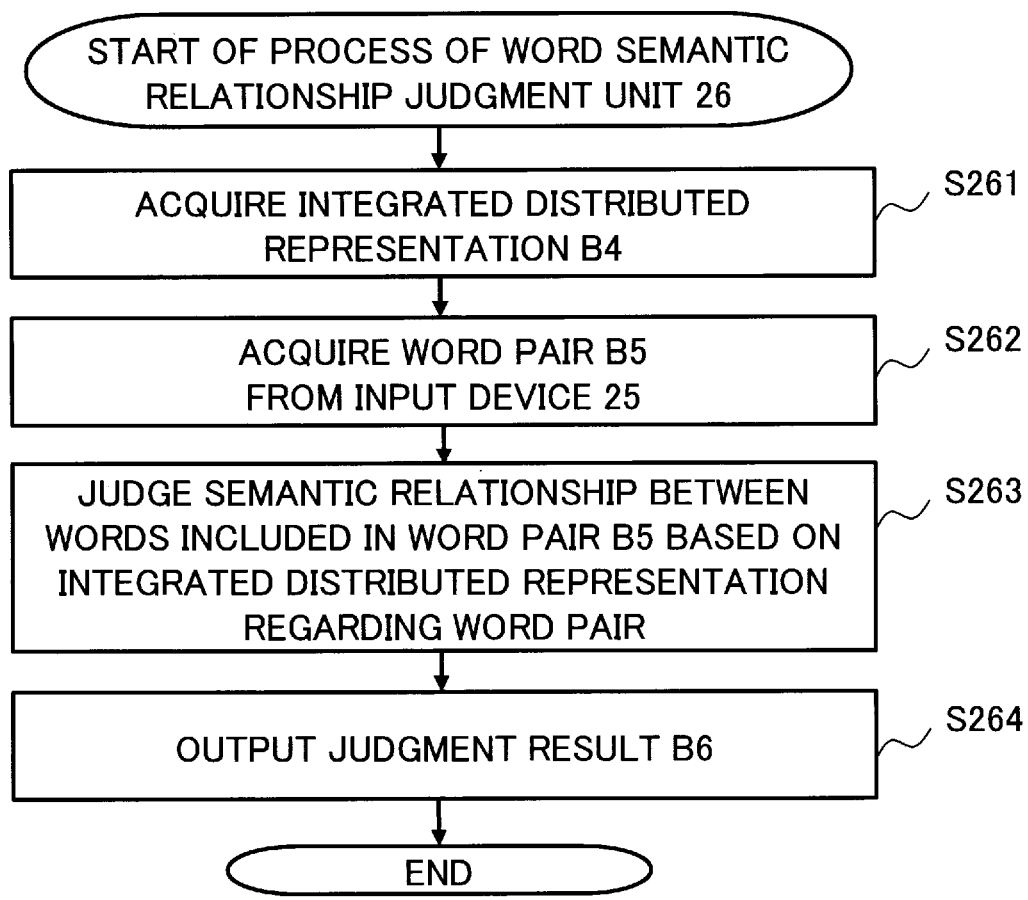
FIG. 10 is a flowchart showing a process executed by a word semantic relationship judgment unit in the second embodiment.

FIG. 10 is a flowchart showing a process executed by the word semantic relationship judgment unit 26 in the second embodiment. As shown in FIG. 10, the word semantic relationship judgment unit 26 acquires the integrated distributed representation B4 (step S261), acquires a pair of words B5 from the input device 25 (step S262), judges the semantic relationship between the pair of words B5 based on the integrated distributed representation B4 regarding the pair of words (step S263), and outputs the result of the judgment to the output device 27 (step S264).

As the semantic relationship between words, there are a synonymous relationship, an antonymous relationship, a superordinate relationship, a subordinate relationship, etc., for example.

Further, in regard to the pair of words B5 inputted from the input device 25, it is also possible to use distance such as cosine distance or Euclidean distance, for example, when obtaining the semantic relationship between the pair of words B5 from the integrated distributed representation B4.

(2-3) Advantage of Information Processing Device 2

As described above, with the information processing device 2 according to the second embodiment, the semantic relationship between a pair of words can be judged by taking into consideration both of the spatiotemporal information-considered distributed representation, as the distributed representation taking the object spatiotemporal information into consideration, and the word numerical representation of the document data, and thus the accuracy of the judgment can be increased.

(3) Third Embodiment (3-1) Configuration of Information Processing Device 3

An information processing device 3 according to a third embodiment is a sentence semantic relationship judgment device that judges the semantic relationship between a pair of sentences. (e.g., similarity between a sentence and a sentence).

Figure 11:
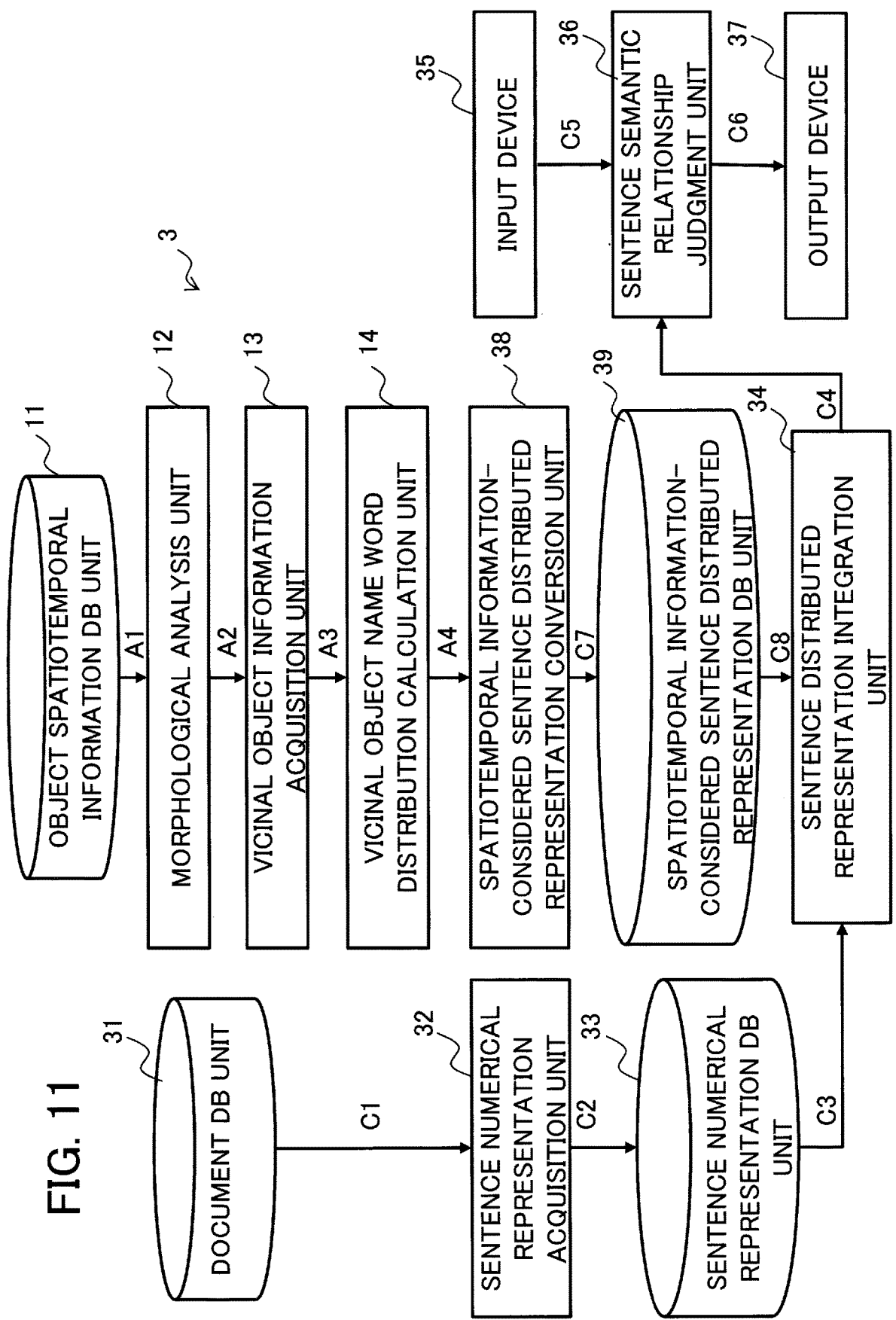
FIG. 11 is a block diagram schematically showing a configuration of an information processing device according to a third embodiment of the present invention.

FIG. 11 is a block diagram schematically showing a configuration of the information processing device 3 according to the third embodiment. The information processing device 3 is a device capable of executing an information processing method according to the third embodiment. In FIG. 11, each component identical or corresponding to a component shown in FIG. 1 is assigned the same reference character as in FIG. 1.

As shown in FIG. 11, the information processing device 3 according to the third embodiment includes a document database unit (referred to also as a "document DB unit") 31 that stores large-scale document data, a sentence numerical representation acquisition unit 32, a sentence numerical representation database unit (referred to also as a "sentence numerical representation DB unit") 33, a sentence distributed representation integration unit 34, an input device 35, a sentence semantic relationship judgment unit 36 and an output device 37. The input device 35 is a user operation unit such as a keyboard, for example. The output device 37 is an information provision device for the user such as an image display device or an audio output device.

Further, as shown in FIG. 11, the information processing device 3 according to the third embodiment includes a spatiotemporal information-considered sentence distributed representation conversion unit 38 corresponding to the spatiotemporal information-considered distributed representation conversion unit 15 shown in FIG. 1 and a spatiotemporal information-considered sentence distributed representation DB unit 39 corresponding to the spatiotemporal information-considered distributed representation DB unit 16 shown in FIG. 1.

The spatiotemporal information-considered sentence distributed representation conversion unit 38 acquires the vicinal object name word distribution A4 from the vicinal object name word distribution calculation unit 14, converts the vicinal object name word distribution A4 to a spatiotemporal information-considered sentence distributed representation C7, and outputs the spatiotemporal information-considered sentence distributed representation C7 to the spatiotemporal information-considered sentence distributed representation DB unit 39. The spatiotemporal information-considered sentence distributed representation DB unit 39 stores the spatiotemporal information-considered sentence distributed representation C7.

The spatiotemporal information-considered sentence distributed representation conversion unit 38 is capable of executing the conversion from the vicinal object name word distribution A4 to the spatiotemporal information-considered sentence distributed representation C7 as follows.

For example, the spatiotemporal information-considered sentence distributed representation conversion unit 38 is capable of acquiring the spatiotemporal information-considered sentence distributed representation C7 by acquiring the spatiotemporal information-considered distributed representation of words included in a sentence by a method similar to the method of the spatiotemporal information-considered distributed representation conversion unit 15 and thereafter adding up the value of the distributed representation of the words included in the sentence.

It is also possible for the spatiotemporal information-considered sentence distributed representation conversion unit 38 to, for example, acquire the spatiotemporal information-considered distributed representation of the words included in a sentence by a method similar to the method of the spatiotemporal information-considered distributed representation conversion unit 15 and thereafter acquire the spatiotemporal information-considered sentence distributed representation C7 by using an autoencoder as an algorithm using a neural network. The autoencoder is a publicly known technology, and a technology described in Non-patent Reference 3 can be used, for example.

Non-patent Reference 3: Hinton, G. E. and another, "Reducing the Dimensionality of Data with Neural Networks", Science Vol. 313, pp. 504-507, Jul. 28, 2006.

The sentence numerical representation acquisition unit 32 acquires document data C1 from the document DB unit 31 storing a large-scale document DB, and acquires a sentence numerical representation C2 from the document data C1 by digitizing sentences included in the document data C1 into numerical values. The sentence numerical representation DB unit 33 stores the sentence numerical representation C2. The technology of the acquisition of the sentence numerical representations is publicly known, and a technology described in Non-patent Reference 4 can be used, for example.

Non-patent Reference 4: Hideaki Joko and three others, "Intention Understanding with Small Training Data Sets by Utilizing Multi-Task Transfer Learning", The Japanese Society for Artificial Intelligence, Interactive Information Access and Visual Mining (19th), 2018.

The sentence distributed representation integration unit 34 generates an integrated sentence distributed representation C4 by an integrating spatiotemporal information-considered sentence distributed representation C8 acquired from the spatiotemporal information-considered sentence distributed representation DB unit 39 and a sentence numerical representation C3 acquired from the sentence numerical representation DB unit 33. The integrated sentence distributed representation C4 is outputted to the sentence semantic relationship judgment unit 36. Here, the spatiotemporal information-considered sentence distributed representation C8 is a sentence distributed representation selected from the spatiotemporal information-considered sentence distributed representations C7 stored in the spatiotemporal information-considered sentence distributed representation DB unit 39. The sentence numerical representation C3 is a sentence numerical representation selected from a sentence numerical representation DB stored in the sentence numerical representation DB unit 33.

As the method of generating the integrated sentence distributed representation C4 by integrating the spatiotemporal information-considered sentence distributed representation C8 and the sentence numerical representation C3, the sentence distributed representation integration unit 34 can use a method similar to the method of the distributed representation integration unit 24 shown in FIG. 7.

The sentence semantic relationship judgment unit 36 makes the judgment on the semantic relationship between a pair of sentences C5 inputted from the input device 35 by using the integrated sentence distributed representation C4. The sentence semantic relationship judgment unit 36 generates a sentence semantic relationship judgment result C6. The output device 37 outputs the judgment result C6.

The information processing device 3 according to the third embodiment can be implemented by the same hardware configuration as that shown in FIG. 3. The morphological analysis unit 12, the vicinal object information acquisition unit 13, the vicinal object name word distribution calculation unit 14, the spatiotemporal information-considered sentence distributed representation conversion unit 38, the sentence numerical representation acquisition unit 32, the sentence distributed representation integration unit 34 and the sentence semantic relationship judgment unit 36 shown in FIG. 11 can be implemented by the processor 101 executing an information processing program stored in the memory 102. Further, the object spatiotemporal information DB unit 11, the spatiotemporal information-considered sentence distributed representation DB unit 39 and the sentence numerical representation DB unit 33 shown in FIG. 11 can be a part of the auxiliary storage device 106.

(3-2) Operation of Information Processing Device 3

Figure 12:
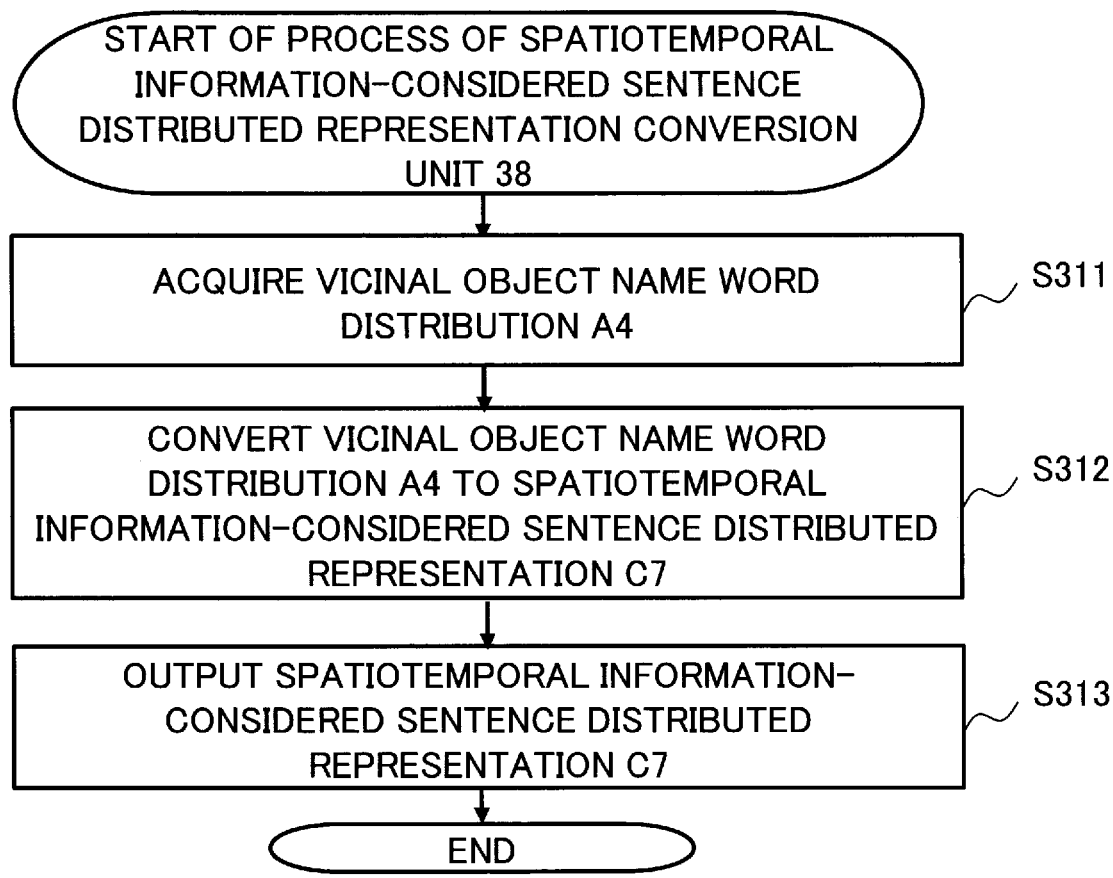
FIG. 12 is a flowchart showing a process executed by a spatiotemporal information-considered sentence distributed representation conversion unit in the third embodiment.

FIG. 12 is a flowchart showing a process executed by the spatiotemporal information-considered sentence distributed representation conversion unit 38 in the third embodiment. As shown in FIG. 12, the spatiotemporal information-considered sentence distributed representation conversion unit 38 acquires the vicinal object name word distribution A4 from the vicinal object name word distribution calculation unit 14 (step S311), converts the vicinal object name word distribution A4 to the spatiotemporal information-considered sentence distributed representation C7 (step S312), and outputs the spatiotemporal information-considered sentence distributed representation C7 to the spatiotemporal information-considered sentence distributed representation DB unit 39 (step S313).

Figure 13:
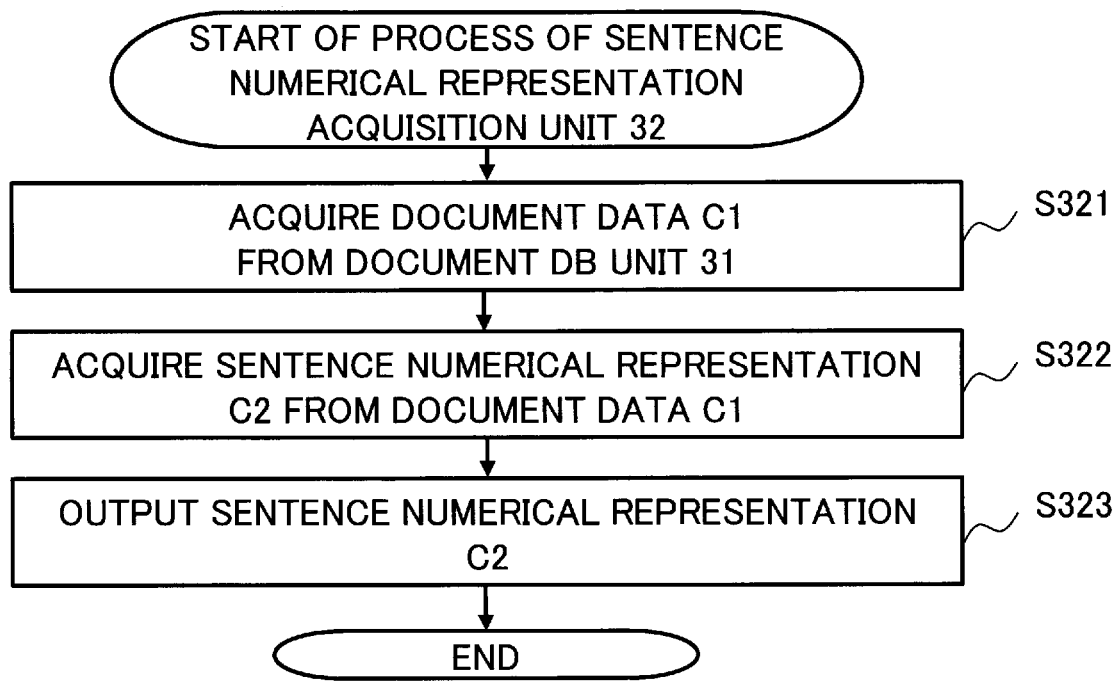
FIG. 13 is a flowchart showing a process executed by a sentence numerical representation acquisition unit in the third embodiment.

FIG. 13 is a flowchart showing a process executed by the sentence numerical representation acquisition unit 32 in the third embodiment. As shown in FIG. 13, the sentence numerical representation acquisition unit 32 acquires the document data C1 from the document DB unit 31 (step S321), acquires the sentence numerical representation C2 from the document data C1 by digitizing sentences included in the document data C1 into numerical values (step S322), and outputs the sentence numerical representation C2 (step S323).

Figure 14:
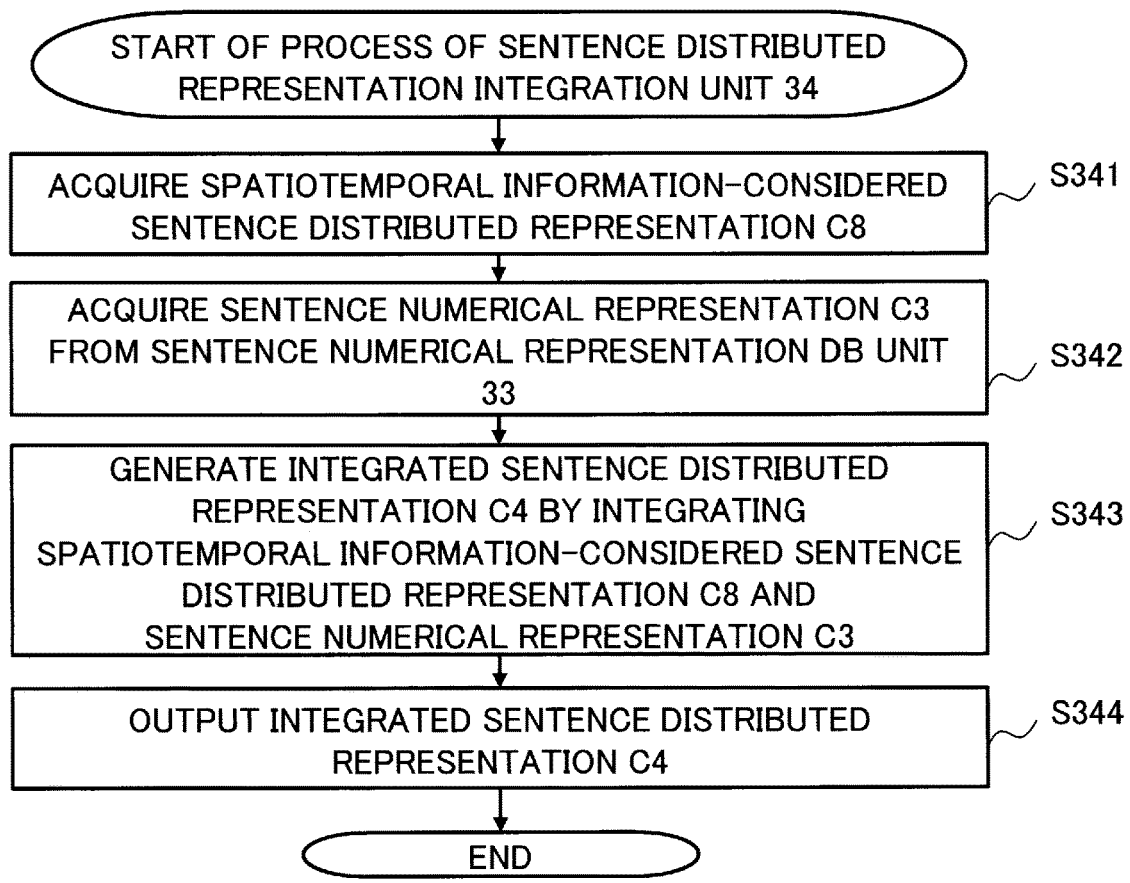
FIG. 14 is a flowchart showing a process executed by a sentence distributed representation integration unit in the third embodiment.

FIG. 14 is a flowchart showing a process executed by the sentence distributed representation integration unit 34 in the third embodiment. As shown in FIG. 14, the sentence distributed representation integration unit 34 acquires the spatiotemporal information-considered sentence distributed representation C8 from the spatiotemporal information-considered sentence distributed representation DB unit 39 (step S341), acquires the sentence numerical representation C3 from the sentence numerical representation DB unit 33 (step S342), generates the integrated sentence distributed representation C4 by integrating the spatiotemporal information-considered sentence distributed representation C8 acquired from the spatiotemporal information-considered sentence distributed representation DB unit 39 and the sentence numerical representation C3 acquired from the sentence numerical representation DB unit 33 (step S343), and outputs the integrated sentence distributed representation C4 (step S344).

Figure 15:
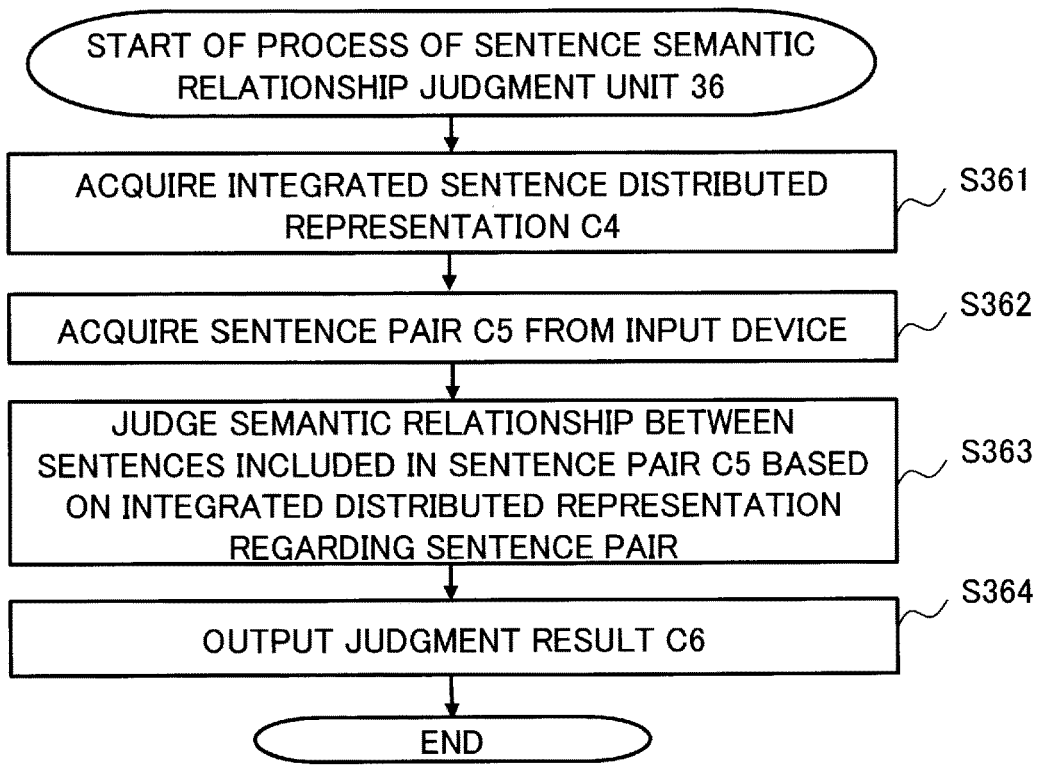
FIG. 15 is a flowchart showing a process executed by a sentence semantic relationship judgment unit in the third embodiment.

FIG. 15 is a flowchart showing a process executed by the sentence semantic relationship judgment unit 36 in the third embodiment. As shown in FIG. 15, the sentence semantic relationship judgment unit 36 acquires the integrated sentence distributed representation C4 (step S361), acquires a pair of sentences C5 inputted from the input device 35 (step S362), generates the sentence semantic relationship judgment result C6 by judging the semantic relationship between the inputted pair of sentences C5 (step S363), and outputs the sentence semantic relationship judgment result C6 (step S364).

(3-3) Advantage of Information Processing Device 3

As described above, with the information processing device 3 according to the third embodiment, the semantic relationship between a pair of sentences can be judged by taking into consideration both of the spatiotemporal info/oration-considered sentence distributed representation, as the distributed representation taking the object spatiotemporal information into consideration, and the sentence numerical representation of the document data, and thus the accuracy of the judgment can be increased.

DESCRIPTION OF REFERENCE CHARACTERS 1-3: information processing device, 11: object spatiotemporal information DB unit, 12: morphological analysis unit, 13: vicinal object information acquisition unit, 14: vicinal object name word distribution calculation unit, 15: spatiotemporal information-considered distributed representation conversion unit, 16: spatiotemporal information-considered distributed representation DB unit, 21, 31: document DB unit, 22: word numerical representation acquisition unit, 23: word numerical representation DB unit, 24: distributed representation integration unit, 25, 35: input device, 26: word semantic relationship judgment unit, 27, 37: output device, 32: sentence numerical representation acquisition unit, 33: sentence numerical representation DB unit, 34: sentence distributed representation integration unit, 36: sentence semantic relationship judgment unit, 38: spatiotemporal information-considered sentence distributed representation conversion unit, 39: spatiotemporal information-considered sentence distributed representation DB unit.

What is claimed is:

1. An information processing device comprising: processing circuitry
to acquire object spatiotemporal information including spatiotemporal information indicating coordinates of a plurality of objects in time and space and a respective name of each of the plurality of objects and to generate morphological analysis-undergone object spatiotemporal information by executing a morphological analysis as a process of analyzing the respective name of each of the plurality of objects included in the object spatiotemporal information into one or more words;
to acquire morphological analysis-undergone names of vicinal objects, as objects existing in a vicinity of each of the plurality of objects in time and space, from the morphological analysis-undergone object spatiotemporal information;
to calculate a distribution of vicinal object name words, as words included in the names of the vicinal objects of each of the plurality of objects, from the morphological analysis-undergone names; and
to convert the distribution of the vicinal object name words to a spatiotemporal information-considered distributed representation regarding words.

2. The information processing device according to claim 1, further comprising:
an object spatiotemporal information database to store the object spatiotemporal information, wherein
the processing circuitry acquires the object spatiotemporal information from the object spatiotemporal information database, and
the processing circuitry performs the morphological analysis on the object spatiotemporal information acquired from the object spatiotemporal information database.

3. The information processing device according to claim 1, further comprising:
a spatiotemporal information-considered distributed representation database to store the spatiotemporal information-considered distributed representation.

4. The information processing device according to claim 1, wherein the processing circuitry
acquires document data and acquires a word numerical representation from the document data by digitizing words included in the document data into numerical values;
generates an integrated distributed representation by integrating the word numerical representation and the spatiotemporal information-considered distributed representation; and
judges a semantic relationship between an inputted pair of words by using the integrated distributed representation, thereby generating a result of the judgment.

5. The information processing device according to claim 4, further comprising:
a word numerical representation database to store the word numerical representation acquired by the processing circuitry, wherein
the processing circuitry acquires the word numerical representation from the word numerical representation database, and
the processing circuitry generates the integrated distributed representation by integrating the word numerical representation acquired from the word numerical representation database and the spatiotemporal information-considered distributed representation.

6. The information processing device according to claim 4, further comprising:
a spatiotemporal information-considered distributed representation database to store the spatiotemporal information-considered distributed representation; and
a word numerical representation database to store the word numerical representation acquired by the processing circuitry, wherein
the processing circuitry acquires the word numerical representation from the word numerical representation database,
the processing circuitry acquires the spatiotemporal information-considered distributed representation from the spatiotemporal information-considered distributed representation database, and
the processing circuitry generates the integrated distributed representation by integrating the word numerical representation acquired from the word numerical representation database and the spatiotemporal information-considered distributed representation acquired from the spatiotemporal information-considered distributed representation database.

7. The information processing device according to claim 1, wherein the processing circuitry has a function of converting the spatiotemporal information-considered distributed representation regarding words to a spatiotemporal information-considered sentence distributed representation as a distributed representation regarding a sentence including a plurality of words.

8. The information processing device according to claim 7, further comprising:
a spatiotemporal information-considered sentence distributed representation database to store the spatiotemporal information-considered sentence distributed representation.

9. The information processing device according to claim 7, wherein the processing circuitry
acquires document data and acquires a sentence numerical representation from the document data by digitizing sentences included in the document data into numerical values;
generates an integrated sentence distributed representation by integrating the sentence numerical representation and the spatiotemporal information-considered sentence distributed representation; and
judges a semantic relationship between an inputted pair of sentences by using the integrated sentence distributed representation, thereby generating a result of the judgment.

10. The information processing device according to claim 9, further comprising:
a sentence numerical representation database to store the sentence numerical representation acquired by the processing circuitry, wherein
the processing circuitry acquires the sentence numerical representation from the sentence numerical representation database, and
the processing circuitry generates the integrated sentence distributed representation by integrating the sentence numerical representation acquired from the sentence numerical representation database and the spatiotemporal information-considered sentence distributed representation.

11. The information processing device according to claim 9, further comprising:
a spatiotemporal information-considered sentence distributed representation database to store the spatiotemporal information-considered sentence distributed representation: and
a sentence numerical representation database to store the sentence numerical representation acquired by the processing circuitry, wherein
the processing circuitry acquires the sentence numerical representation from the sentence numerical representation database,
the processing circuitry acquires the spatiotemporal information-considered sentence distributed representation from the spatiotemporal information-considered sentence distributed representation database, and
the processing circuitry generates the integrated sentence distributed representation by integrating the sentence numerical representation acquired from the sentence numerical representation database and the spatiotemporal information-considered sentence distributed representation acquired from the spatiotemporal information-considered sentence distributed representation database.

12. An information processing method comprising:
acquiring object spatiotemporal information including spatiotemporal information indicating coordinates of a plurality of objects in time and space and a respective name of each of the plurality of objects and generating morphological analysis-undergone object spatiotemporal information by executing a morphological analysis as a process of analyzing the respective name of each of the plurality of objects included in the object spatiotemporal information into one or more words;
acquiring morphological analysis-undergone names of vicinal objects, as objects existing in a vicinity of each of the plurality of objects in time and space, from the morphological analysis-undergone object spatiotemporal information;
calculating a distribution of vicinal object name words, as words included in the names of the vicinal objects of each of the plurality of objects, from the morphological analysis-undergone names; and
converting the distribution of the vicinal object name words to a spatiotemporal information-considered distributed representation regarding words.

13. A non-transitory computer-readable storage medium storing an information processing program that causes a computer to execute processing comprising:
acquiring object spatiotemporal information including spatiotemporal information indicating coordinates of a plurality of objects in time and space and a respective name of each of the plurality of objects and generating morphological analysis-undergone object spatiotemporal information by executing a morphological analysis as a process of analyzing the respective name of each of the plurality of objects included in the object spatiotemporal information into one or more words;
acquiring morphological analysis-undergone names of vicinal objects, as objects existing in a vicinity of each of the plurality of objects in time and space, from the morphological analysis-undergone object spatiotemporal information;
calculating a distribution of vicinal object name words, as words included in the names of the vicinal objects of each of the plurality of objects, from the morphological analysis-undergone names; and
converting the distribution of the vicinal object name words to a spatiotemporal information-considered distributed representation regarding words.

\* \* \* \* \*